Feb. 3, 1959          A. DREISIN ET AL          2,871,796
                       PILOT INJECTION PUMP

Filed Aug. 2, 1955                        3 Sheets-Sheet 1

INVENTORS.
Alexander Dreisin,
BY Louis G. Kaplan,
Cromwell, Greist & Warden
Attys United States Patent Office 2,871,796
Patented Feb. 3, 1959

2,871,796

PILOT INJECTION PUMP

Alexander Dreisin, Highland Park, and Louis G. Kaplan, Evanston, Ill., assignors, by mesne assignments, to Allis-Chalmers Manufacturing Company, a corporation of Delaware Application August 2, 1955, Serial No. 525,859

18 Claims. (Cl. 103—154)

The present invention relates generally to an improvement in injection pumps for use in supplying fuel to compression ignition engines. More specifically, the present invention is directed to an improvement in design and operation of an injection pump whereby the time lapse between the start of the main fuel injection and the initiation of combustion is substantially reduced.

It has been found that in the operation of conventional injection systems with fuels of low cetane rating there is a considerable lapse of time between the start of injection and initiation of combustion. As a result of this time lapse a large portion of the fuel charge may be introduced into the engine cylinder before combustion is initiated. The presence of a large portion of the fuel charge in the engine cylinder thoroughly dispersed therein and mixed with the cylinder air prevents precise control of the combustion process and may result in excessively high rates of cylinder pressure rise leading to inefficient and rough engine operation and to a reduction in engine life.

This difficulty may be overcome by injecting a small portion of the fuel charge into the cylinder prior to the main injection. By properly controlling the time interval between the injection of the pilot charge and the subsequent injection of the main charge, the pilot charge can be ignited and a hot flame well established in the cylinder combustion chamber by the time the main fuel charge is introduced into the cylinder. The main fuel charge will then be injected into a hot mass of flaming gas resulting in a reduction in the length of the effective ignition lag interval. The reduction in ignition time lag of the main injection prevents an excessive accumulation of fuel in the engine cylinder at the time of ignition and hence facilitates accurate control of the combustion process and allows a compression ignition engine to operate smoothly and efficiently on a wide range of diesel fuels as well as other fuels of low cetane rating, such as kerosene or gasoline.

It is therefore an object of the present invention to provide an injection pump capable of introducing a pilot charge into a cylinder of a compression-ignition engine just immediately prior to the injection of the main fuel charge thereinto.

Another object is to regulate the fuel pressure in the injection line of an injection pump to provide instantaneous response during the cycle of operation of the pump to relatively slight changes in pressure and, as a result, obtain close control of the amounts of fuel delivered by the pump as well as closely controlled time intervals between each delivery.

In order to describe the type of injection pump design contemplated by the present invention and in order to make apparent further objects not specifically set forth, reference is made to the accompanying drawings wherein.

Figures 1, 18:
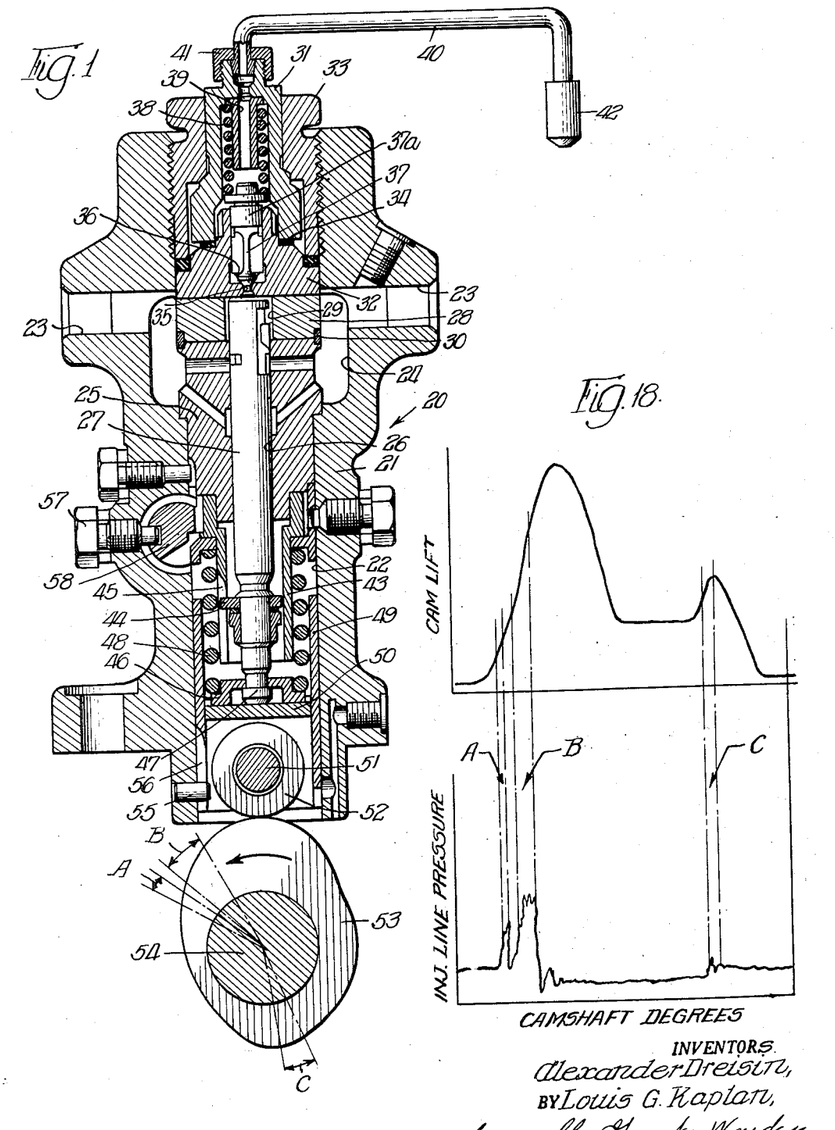
Fig. 1 is a partial vertical section illustrating the type of injection pump contemplated for use in carrying out the objects of the present invention.
Fig. 18 is a diagrammatic graphic showing of a cam lift correlated with injection line pressure during a complete cycle of camshaft rotation.

Referring to Fig. 1, an injection pump 20 is shown without attachments from a conventional fuel supply source as including a pump housing 21 which contains a central bore 22 and fuel conduits 23. The fuel conduits 23 open into an internal annular recess 24 forming a fuel supply chamber which in turn communicates with a barrel 25 inserted in the central bore 22 of the pump housing 21. The barrel 25 has an internal bore 26 in which a plunger 27 is movable. Fitted against the top of the barrel 25 is an annular insert 28 which contains an internal pump or fuel chamber 29 and which is sealingly engaged with the barrel 25 by a lapped fit and held in alignment by a locating ring 30. Above the annular insert 28 is a valve actuating housing 31 which is clamped downwardly against a valve housing 32 by a locking member 33 threadedly engaged in the upper portion of the pump housing 21. The valve actuating housing 31 is externally sealed with the valve housing 32 by a high pressure seal 34. The valve housing 32 contains a fuel orifice 35 communicating with the pump or fuel chamber 29. The fuel orifice 35 further communicates with a valve seat 36 which in turn cooperates with a delivery valve 37 urged downwardly by a spring 38 suitably mounted in the valve actuating housing 31. The upper portion of the delivery valve 37 forms a piston 37a which is movable within the bore of the valve housing 32. The outside diameter of the piston 37a is such that a predetermined and accurately maintained clearance exists between the piston and the bore. The clearance not only allows the piston 37a to move freely relative to the bore but further aids in the operation of the pump as will hereinafter be described. A delivery valve stop 39 in the form of a sleeve is inserted within the coils of the spring 38 in the valve actuating housing 31 to limit the upward movement of the piston 37a during a part of the cycle of operation. An injection line 40 is suitably fastened to the upper portion of the valve actuating housing 31 by a threadedly engageable cap 41. The injection line 40 has attached to the remaining end thereof an injection nozzle 42 of conventional design which includes a pressure actuated valve therein.

The plunger 27 is movable within the internal bore 26 of the barrel 25 by the cooperation of various parts associated with the lower portion of the pump housing 21. The central bore 22 of the pump housing 21 contains a sleeve 43 suitably mounted in the lower portion thereof which forms a partial annular wall about the lower portion of the plunger 27. A shoulder 44 extends from the plunger 27 and is engaged in a slot 45 in the sleeve 43. A bracket 46 engages a shoulder 47 at the bottom of the plunger 27 and contains an abutment face for receiving one end of a spring 48. The remaining end of the spring 48 abuts against a suitable shoulder positioned within the central bore 22 of the pump housing 21. A second sleeve 49 is positioned within the central bore 22 of the pump housing 21 and contains a plate 50 which extends across the inner recess thereof to which the bracket 46 is suitably held by the bias of spring 48.

The sleeve 49 also mounts a shaft 51 on which a cam follower 52 is positioned and which in turn cooperates with the outer peripheral surface of a cam 53 mounted on a shaft 54 below the pump housing 21. A pin 55 extends through the wall of the pump housing 21 near the bottom edge thereof and extends within a groove 56 which is formed in the sleeve 49 thereby preventing rotation of the sleeve 49 within the bore 22 hence assuring proper alignment between the cam follower 52 mounted thereon and the cam 53.

With reference to one form of design of the barrel 25 and the plunger 27 which is an important part of the present invention, Figs. 2–9 illustrate the various changes in operative positions of the plunger during a complete cycle of operation of the injection pump. Referring first to the structural details of the design set forth in Figs. 2–9, the barrel 25 contains an angled passageway 60 extending therethrough into communication with the internal bore 26. That portion of the internal bore 26 which is in communication with the passageway 60 is grooved to form an annulus 61 which is in communication with a second angled passageway 62 extending through the barrel 25 opposite the passageway 60. An additional passageway 63 extends through the barrel 25 above passageway 62 and communicates with the internal bore 26. Still another passageway 64 extends through that portion of the barrel 25 opposite to the passageway 63 and may be positioned above the passageway 60 for communication with the internal bore 26. The passageways 60, 62, 63 and 64 afford means for the delivery of fuel to and from the internal bore 26 of the barrel 25.

A plunger of the design shown in Figs. 2–9 contains conduit means or channels including a semi-annular transverse groove 65 which extends partially about the circumference of the plunger 27. The groove 65 is in communication with the top surface of the plunger 27 by means of a vertical groove 66 which is shown in dotted lines in the figures. The vertical groove 66 communicates solely with the transverse groove 65 and the top of the plunger 27. A transverse groove 67 is positioned on the side of the plunger opposite of groove 65. Here again the groove 67 extends partially about the outer circumference of the plunger 27 and is out of communication with the groove 65. A vertical groove 68 communicates with the transverse groove 67 and extends upwardly therefrom toward the top of the plunger 27. One side of the vertical groove 68 is cut away to form a helix 69 or curvilinear lateral expansion of the groove 68 at the point where the groove 68 joins the transverse groove 67. An additional transverse groove 70 is positioned near the top of the plunger 27 and extends substantially about the circumference thereof and is in communication with the vertical groove 68 thereby providing communication between the transverse grooves 67 and 70 by means of the vertical groove 68. The upper limit of the transverse groove 70 is defined by a rim 71 which extends slightly inwardly from the top surface of the plunger 27 and is in communication with the walls of the internal bore 26 throughout the entire circumference of the plunger 27 with the exception of the provision of the vertical groove 66. The transverse groove 70 is out of communication with the vertical groove 66 and the transverse groove 65 but is in communication with transverse groove 67 as previously described.

Figure 2:
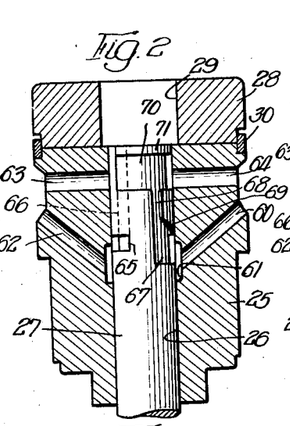
Fig. 2 is a partial vertical section of a barrel and plunger suitable for use in the pump of Fig. 1.
Figure 3:
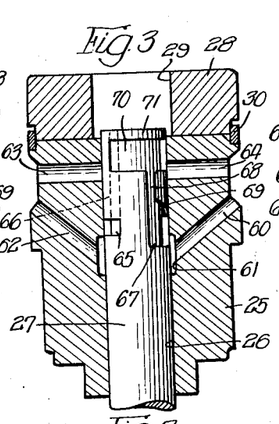
Figs. 3–9 are views similar to Fig. 2 illustrating the various positions of the plunger in the barrel during one complete cycle of operation of the injection pump.

In the operation of the form of barrel and plunger above described reference is made to Figs. 1–9. The position of the plunger 27, as shown in Fig. 2 and as governed by the rotation of the cam 53 on the shaft 54, illustrates the bottom of the stroke. Fuel under pressure is admitted into the internal bore 26 of the barrel 25 through the fuel conduits 23 and the passageways 60, 62, 63 and 64. The fuel flows through angled passageways 60 and 62 into the annulus 61 and into contact with the grooves 65 and 67. The fluid flowing into the groove 65 flows upwardly through the vertical groove 66 and out through the top of the plunger 27 into the pump chamber 29. The fuel flowing into contact with the groove 67 flows upwardly through the vertical groove 68 into the transverse groove 70 and combines with that flowing from passageway 64 but is restricted from flowing into the pump chamber 29 by reason of the rim 71. At the cam 53 continues its rotation, the roller 52, sleeve 49, bracket 46 and plunger 27 are all moved upwardly as a unit against the biasing of the spring 48. The fuel in the pump chamber 29 is placed under pressure and part of it escapes back to the supply by the same path through which it entered the pump chamber 29 until the bottom edge of the groove 65 covers the top edge of the annulus 61 thereby blocking off the groove 65 from communication with the passageways 60 and 62 as shown in Fig. 3.

At this point in the cycle, a quantity of fuel is trapped in the pump chamber 29 and further upward movement of the plunger 27 exerts sufficient pressure on the quantity to lift the valve 37 from the valve seat 36 thereby causing the fuel to flow through the valve housing 32, and pass through the clearance between the piston 37a and the bore in the valve housing 32, and through the sleeve 39 into the injection line 40. The valve 37 is not lifted sufficiently to move the piston 37a out of the bore but the fuel nevertheless is introduced into the injection line 40 through the aforementioned clearance.

As will subsequently be described, prior to the completion of the preceding cycle of operation fuel had been introduced under pressure into the injection line 40 into contact with the injection nozzle 42 in preparation for the pilot injection. The fuel being forced by upward movement of the plunger 27 past the valve 37 and into the injection line 40, as previously described, creates sufficient pressure within the injection line 40 and against the pressure actuated valve in the injection nozzle 42 to commence the injection of a small quantity of fuel from the injection nozzle 42 into the cylinder of the compression-ignition engine. This constitutes the pilot injection.

Figure 4:
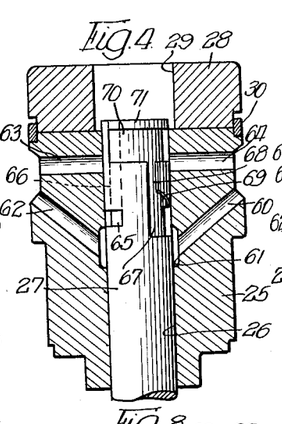

The pilot injection continues until the upward movement of the plunger brings about the uncovering of the top of the barrel 25 by the movement of the upper edge of the transverse groove 70 past the upper edge of the barrel 25. In other words, when the lower edge of the rim 71 passes the upper edge of the internal bore 26 of the barrel 25, the groove 70 is placed in communication with the pump chamber 29 as shown in Fig. 4. At this point in the cycle, the fuel remaining in the pump chamber 29 that is displaced by the plunger 27 is allowed to escape back to the supply through the groove 70 and the passageway 64. The resulting pressure drop in the pump chamber 29 causes the delivery valve 37 to snap shut, dropping the injection line pressure and causing the nozzle valve to close, abruptly ending the pilot injection. As the delivery valve 37 is only slightly lifted during the pilot injection, a substantial pressure is entrapped in the injection line 40. Due to this arrangement a precise control of the amount of fuel introduced into the cylinder (not shown) during the pilot injection is obtained.

Figure 5:
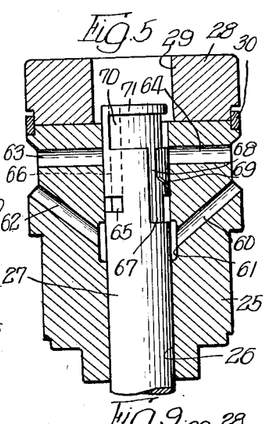

Further upward movement of the plunger 27 brings the lower edge of the transverse groove 70 into contact with the upper edge of the passageway 64 and the lower edge of the transverse groove 67 into contact with the upper edge of the groove 61 thereby closing the return route of the fuel from the pump chamber 29 to the source of supply. This position of the plunger is shown in Fig. 5. It should be noted that the closing of these two grooves need not be simultaneous, and one may close before the other. It is the one that closes last that accomplishes the separation of the chamber 29 from the source of supply.

At this point in the cycle, the pump chamber 29 is full of fuel and escape of the fuel from the chamber is blocked off. Continued upward movement of the plunger intermediate the positions shown in Figs. 5 and 6 forces the fuel in the pump chamber 29 to unseat the valve 37 in upward movement against the spring 39 thereby delivering fuel in the same manner as previously described into the injection line 40 and into contact with the pressure actuated valve in the injection nozzle 42. As an appreciable pressure is retained in the injection line 40 following the pilot injection, a very short time lapse will occur between closure of the fuel escape paths in the pump and opening of the pressure actuated valve in the injection nozzle 42. The upward travel of the plunger is substantial at this phase of the cycle as compared with the upward movement of the plunger during the pilot injection. As a result a substantial quantity of fuel is passed out through the injection nozzle 42 and into the cylinder of the compression-ignition engine. In order to deliver a large quantity of fuel to the injection line 40, the valve 37 may be fully lifted up against the stop 39 and the retraction piston 37a may be lifted completely out of the bore of the valve housing 32.

Figure 6:
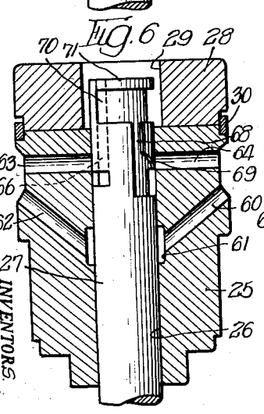

Upward movement of the plunger 27 continues to force fuel out of the injection nozzle 42 until the helix 69 uncovers the lower edge of the passageway 64 as shown in Fig. 6. At this point the fuel remaining in the pump chamber 29 is provided with a series of passages through which it can return to the supply. As shown in Fig. 6, the fuel remaining in the pump chamber 29 can flow through the transverse groove 70, down the vertical groove 68 and through the transverse groove 67 into passageway 64 to the supply. As in the instance of the pilot injection, the pressure built up within the pump chamber 29, valve housing 32, injection line 40 and injection nozzle 42 is rapidly reduced at this point of the cycle and the pressure actuated valve in the injection nozzle 42 immediately closes and the main injection of fuel into the cylinder is completed. The displacement of the delivery valve retraction piston 37a as the delivery valve 37 snaps back to its seat 36 causes a major pressure drop in the injection line 40 to abruptly end the main injection.

Figure 7:
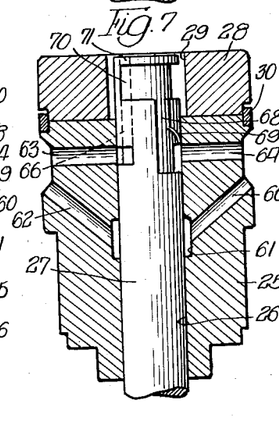

Futher rotation of the cam 53 continues the upward movement of the plunger 27 to the position shown in Fig. 7, which is illustrative of the top of the stroke. Due to the shape of the cam 53, continued rotation thereof causes the plunger to drop downwardly to the position shown in Fig. 8 wherein the fuel is allowed to flow through passageway 64, groove 70, and past the bottom edge of the rim 71 into the pump chamber 29 thereby allowing refilling of the pump chamber 29. The cam 53 further rotates and again moves the plunger 27 upwardly to the position shown in Fig. 9, during which movement the source of supply is cut off by the closing of the passageway 64 and the slight upward movement of the plunger 27 creates sufficient pressure on the fuel within the pump chamber 29 to again slightly unseat the valve 37 and force a quantity of fuel upwardly through the valve housing 32 and valve actuating housing 31 into the injection line 40. The amount of pressure applied to the fuel by the upward movement of the plunger 27 is insufficient to unseat the pressure actuated valve in the injection nozzle 42 and this portion of the cycle merely refills the injection line and injection nozzle with a predetermined quantity of fuel to a pressure slightly below the nozzle valve opening pressure. As the valve 37 is lifted only slightly during the recharging of the injection line 40 a majority of the pressure is retained in the injection line upon the return of the valve 37 to its seat 36. Therefore, the delivery of only a slight quantity of fuel into the injection line 40 during the ensuing pilot injection stroke will result in the opening of the injection nozzle valve.

Figure 8:
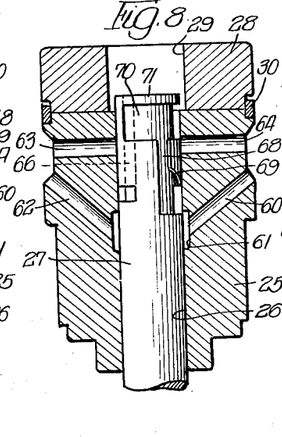
Figure 9:
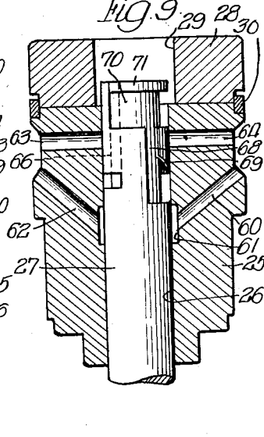

The portion of the cycle shown in Figs. 8 and 9 is the precharging or refilling portion and is for the purpose of assuring accurate measuring of the quantity of fuel to be used during the pilot injection and placing this quantity in position to be discharged from the injection nozzle 42 when the plunger 27 is moved upwardly from its position shown in Fig. 3 to its position shown in Fig. 4. Further rotation of the cam 53 drops the plunger 27 back into the position shown in Fig. 2 and the cycle is recommenced. It should be noted that in many pump applications the pilot injection feature of the pump will function satisfactorily without the secondary delivery as described occurring in the interval between the positions shown in Figs. 8 and 9. This is particularly true when the pump is required to operate over a limited camshaft speed range. In these instances this particular feature may be eliminated by eliminating the second lift on the cam as shown in Fig. 18.

As can be seen from the foregoing description, the amount of fuel introduced into the cylinder of the compression-ignition engine can be accurately controlled by the arrangement of grooves and passageways in the associated plunger and barrel. To further control the amount of fuel introduced into the cylinder during the main injection portion of the cycle, the helix 69 or curvilinear lateral expansion of the vertical groove 68 is provided. The plunger 27 can be rotated about its longitudinal axis within the internal bore 26 of the barrel 25 thereby controlling the width of the groove 67 presented to the passageway 64. In referring to Fig. 1, by sliding the rack 58 within the pump housing 21 the pinion sleeve 43 is caused to rotate and the finger 44 which engages in groove 45 in the pinion 43 causes the plunger 27 to rotate in a similar manner. Widening or narrowing of the transverse groove 67 by rotation of the plunger 27 controls the total distance of upward movement of the plunger between the positions shown in Figs. 5 and 6 during which time the pump chamber 29 is sealed from contact with the passageway 64. In other words, rotation of the plunger 27 governs the point of upward travel of the plunger 27 at which the helix 69 will rise above the lower edge of the passageway 64 thereby allowing the fuel in the pump chamber 29 to escape back to the supply. When the plunger 27 is rotated so that the vertical groove 66 is in communication with the hole 63, throughout the entire cycle no pumping will occur either during the pilot or the main portions of the stroke. This constitutes the pump shut off position.

Figures 10, 11:
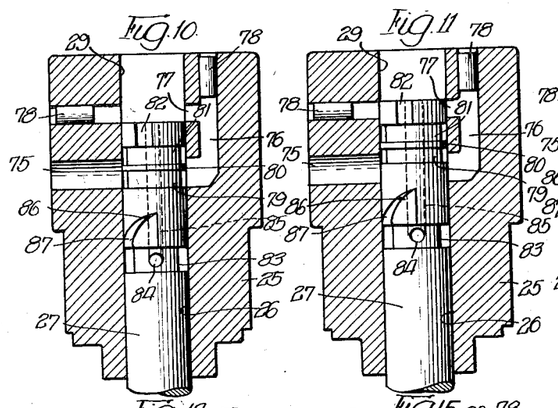
Fig. 10 is a partial vertical section of a modified design of barrel and plunger suitable for use in the pump of Fig. 1.
Figs. 11–17 are views similar to Fig. 10 illustrating the various positions of the plunger in the barrel during one complete cycle of operation.
Figures 12, 13:
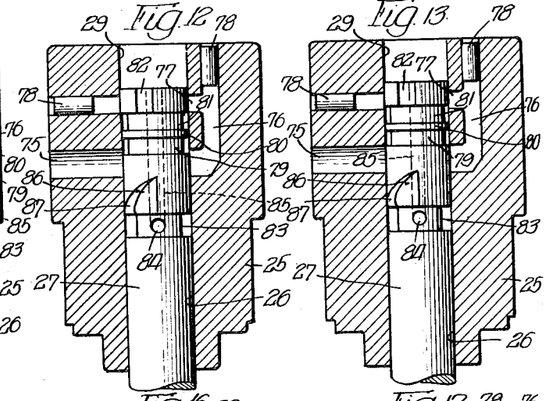

Figs. 10–17 illustrate a modified design of a channel carrying plunger and barrel capable of carrying out the objects of the present invention in a manner similar to that described in connection with the modification shown in Figs. 2–9. The multiple figures again illustrate the various positions of the plunger 27 with relation to the passageways extending through the barrel 25 at various stages in the movement of the plunger through a complete cycle of operation. The plunger 27, as shown in Fig. 10, is in a position representing the bottom of the stroke and at this point in the cycle of operation, fuel is admitted to the pump chamber 29 through a passageway 75, a passageway 76 and a passageway 77. It will be noted that in Fig. 10 the pump chamber 29 is formed as an integral part of the barrel 25 and for convenience in the machining of the barrel 25, the passageways are drilled straight through from an outer edge of the barrel 25. The passageway 76 as shown extends upwardly to the upper edge of the barrel 25 and that portion of the passageway 76 extending above the passageway 77 is blocked off by a plug 78. In a similar manner the passageway 77 is drilled straight through into contact with the passageway 76 from a side of the barrel 25. That portion of passageway 77 which is not in use is suitably plugged by the plug 78.

The fuel flows as previously described through passageway 75 and along an annular groove 79 on the plunger 27 which is bounded along one side thereof by a rim 80 which separates the annular groove 79 from a second annular groove 81. The annular groove 81 is in communication with the top surface of the plunger 27 by a vertical groove 82. Rotation of the cam 53 moves the plunger 27 upwardly to a position where the upper edge of the plunger 27 contacts the upper edge of the passageway 77 and the upper edge of the rim 80 is moved upwardly beyond the upper edges of the passageways 75 and 76. This position of the plunger 27 is shown in Fig. 11 and it can be seen that the fuel in the pump chamber 29 is trapped therein and further upward movement of the plunger 27 to the position shown in Fig. 12 forces the fuel upwardly past the valve 37 and into the injection line 40 thereby creating sufficient pressure on the fuel contained within the injection line 40 and the injection nozzle 42 to force a predetermined quantity past the pressure actuated valve in the injection nozzle 42.

This point of the cycle commences the pilot injection as previously described which is abruptly ended when the upward movement of the plunger 27 causes the upper edge of the annular groove 81 to pass upwardly beyond the lower edge of the passageway 77. Up to this point in the operation, it can be readily seen that the land or rim 80 cooperates with the internal bore 26 of the barrel 25 to prevent the escape of the fuel from the pump chamber 29 back to the passageway 75 through the vertical groove 82 and the annular groove 81. However, when the upper edge of the annular groove 81 clears the lower edge of the passageway 77, the fuel is allowed to flow back to its supply through the vertical groove 82, the annular groove 81, the passageway 77, the passageway 76, the annular groove 79 and the passageway 75. This position of the plunger 27 occurs intermediate those shown in Figs. 12 and 13.

Upon the reduction of pressure against the pressure actuated valve in the injection nozzle 42, the pilot injection is completed and the valve 37 reseats thereby cutting off flow of fuel and entrapping a substantial fuel pressure in the injection line 40.

Figures 14, 15, 16, 17:
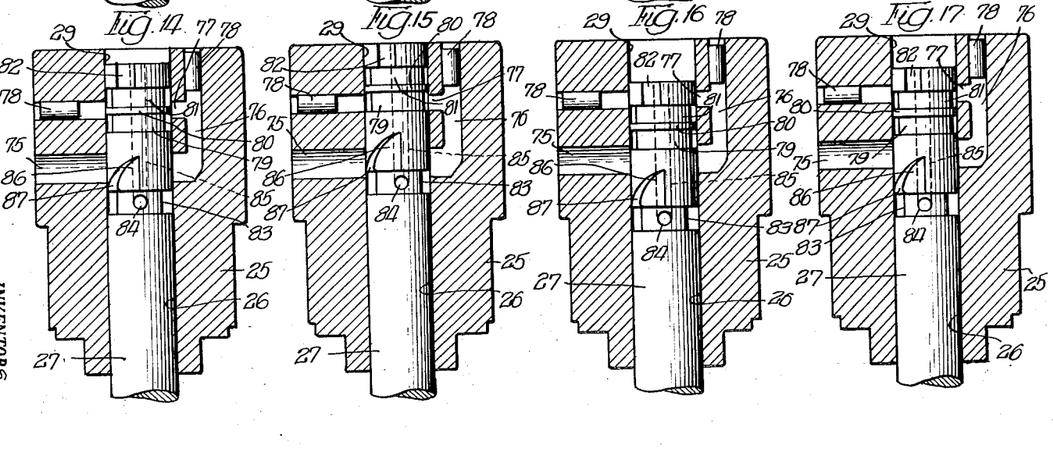

The plunger 27 continues to move upwardly to the position shown in Fig. 14 during which upward movement sufficient pressure is built up within the pump chamber 29 to overcome the pressure of the spring 38 thereby unseating the valve 36 and introducing fuel into the injection line 40 and past the valve and the injection nozzle 42. This portion of the cycle brings about the introduction of the main quantity of fuel into the cylinder of a compression-ignition engine in a manner similar to that described in connection with the modification shown in Figs. 2-9.

Spaced downwardly from the annular groove 79 on the plunger 27 is an annular groove 83 which is in communication with a bore 84 which in turn extends inwardly toward the center of the plunger 27. The bore 84 communicates with a vertical bore 85 extending upwardly to the top surface of the plunger 27. Communicating with the annular groove 83 is a vertical groove 86 which has one side thereof formed in the shape of a helix 87. Further upward movement of the plunger 27 to the position shown in Fig. 14 brings a portion of the helix 87 or curvilinear lateral expansion of the vertical groove 86 into communication with the passageway 75. At this point of the cycle the passageway 75 is in communication with the pump chamber 29 and the fuel remaining in the pump chamber 29 is allowed to escape therefrom through the bores 85 and 84, the annular groove 83 and the vertical groove 86, and passageway 75.

As shown in Fig. 15, the plunger 27 has reached the top of the stroke and it then begins to move downwardly by the action of the cam 53 to a refill position shown in Fig. 16. In this position fuel is introduced into the pump chamber 29 through the passageway 75, the annular groove 79, the passageway 76, passageway 77, the annular groove 81 and the vertical groove 82. The bottom edge of the annular groove 79 is slightly below the top edge of the passageway 75 while the top edge of the annular groove 81 is slightly above the bottom edge of the passageway 77. Fuel is thereby introduced back into the pump chamber 29 and further upward movement of the plunger 27 to the position shown in Fig. 17 forces a small quantity of fuel past the valve 37 and into contact with the injection nozzle 42 thereby recharging the nozzle 42 with a quantity sufficient to make up the pilot injection previously described. During this portion of the cycle of operation, the fluid pressure built up within the system is not sufficient to overcome the pressure actuated valve in the injection nozzle 42 thereby insuring against introduction of a quantity of fuel into the cylinder of a compression-ignition engine.

As in a manner similar to that described in connection with the modification shown in Figs. 2-9, the helix 87 is provided to allow regulation of the amount of fuel discharged by the pump during the main injection portion of the cycle. The plunger 27 can be rotated within the internal bore 26 of the barrel 25 to regulate the point in the upward movement of the plunger 27 that the vertical groove 86 comes into contact with the passageway 75. Thus communication between the vertical groove 86 and the passageway 75 at a point near the top of the helix 87 will reduce the amount of fuel discharged by the injection nozzle 42. On the other hand, communication established between the vertical groove 86 and the passageway 75 at a point near the bottom of the helix 87 will result in an increased fuel quantity delivered by the system thereby bringing about the injection of a relatively large quantity of fuel.

Fig. 18 sets forth two correlated diagrammatic curves in graph form illustrating the cam lift applied to the plunger and the variation in injection line pressure during a 360° rotation of the cam 53. The abscissas of each of the graphs represent the degrees of rotation through which the cam 53 moves in completing a cycle while the ordinates represent in the upper graph the linear lift of the cam and in the lower graph the variation in injection line pressure throughout a complete cycle. These curves are presented herewith in order to illustrate the portions of the cycle during which the pilot and main injections as well as the refill are brought about. For example, the portion of the cycle designated by the letter A represents the pilot injection. In referring to the upper graph it will be noted that the linear lift of the plunger is just commencing. Referring to the lower graph it will be noted that the injection line pressure is increased sufficiently to discharge a predetermined quantity of fuel from the injection nozzle. The portion of the cycle represented by the letter B is that during which the main injection takes place. In referring to the upper graph it will be noted that the linear lift of the cam is substantial as compared with the lift occurring during the pilot injection A. The lower graph illustrates the substantial increase in injection line pressure occurring during the main injection B. Still referring to the lower graph it will be noted that following both the pilot and main injection a sudden drop in injection line pressure occurs. This sudden drop is caused by the abrupt closing of the delivery valve 37 and is essential in the operation of the pump for the purpose of obtaining the delivery of predetermined measured quantities of fuel from the pump.

The portion of the cycle designated by the letter C is that portion during which precharging or refill takes place. Referring in particular to the lower graph it will be noted that the injection line pressure measured following the main injection B levels off at a value below its value just prior to the pilot injection A. Due to this difference in pressure it is considered desirable to precharge or refill the injection line to an extent that the pressure therein is increased to a value substantially equal to that shown prior to the pilot injection A. In other words the refill or precharging portion of the cycle is relied upon to restore the injection line fuel pressure to a point where only a slight increase in pressure is necessary to start the pilot injection. For purposes of illustration the pilot injection A, the main injection B and the refill portion of the cycle C are schematically shown in connection with the cam 53 in Fig. 1. As the portions of the cam surface designated by the letters contact the cam follower 52 the pilot injection, main injection or precharge occur in the cycle.

From the foregoing description it can be readily seen that the principles relied upon in the design of the pump plunger 27, its associated barrel 25 and the delivery valve 37 allows the pump to operate to maintain sufficient pressure in the injection line 40 to allow a discharge of an accurately timed and measured quantity of fuel from the nozzle 42. The combined action of the plunger and barrel passages and of the retraction piston 37a of the delivery valve results in the reduction of pressure within the injection line 40 which is of a sufficient degree to instantaneously close the pressure actuated valve within the injection nozzle 42 thereby establishing a sharply defined interval between the introduction of the pilot charge and the main charge into the cylinder. The effectiveness of the pilot injection and the precharging portion of the cycle is dependent upon the use of a predetermined accurately established clearance about the delivery valve piston 37a to alleviate the necessity of substantial movement of the piston during the delivery of small quantities of fuel into the injection line 40.

It should be further clear that the contour of the cam 53 may vary depending upon the type of operation desired. As long as the contour of the cam 53 is such as to operate the plunger to allow the pilot injection and main injection to be carried out, the purposes of the present invention are served. For example, the contour of the cam 53 may be such as to move the plunger through the cycle of operation illustrated in Fig. 18 more than once during a complete 360° rotation of the cam 53. The quantities of fuel delivered to the chamber 29 may be varied as previously described by rotation of the plunger 27.

Obviously many modifications and variations of the invention as hereinbefore set forth may be made without departing from the spirit and scope thereof, and therefore only such limitations should be imposed as are indicated in the appended claims.

I claim:

1. An injection pump comprising a housing, a bore in said housing, means forming a part of said housing defining a fluid chamber communicating with said bore, a valve controlled nozzle assembly communicating with said chamber, a plurality of passageways in said housing and communicating with said bore to deliver fluid thereto and therefrom, and a plunger in said bore, said plunger including a first series of annular and axial channels for alignment with at least one of said passageways to move fluid along said channels between said passageways and said chamber during the movement of said plunger within said bore, and a second series of annular and axial channels for alignment with at least one of said passageways to move fluid along said last named channels between said passageways and said chamber during the movement of said plunger within said bore, said channels of each series communicating with one another to provide for the flow of fluid axially along said plunger to the end thereof adjacent said chamber and directly into and out of said chamber to bring about a discharge of a relatively small quantity of fluid from said nozzle prior to a discharge of a main quantity of fluid therefrom.

2. An injection pump comprising a housing, a bore in said housing, means forming a part of said housing defining a fluid chamber communicating with said bore, a valve controlled nozzle assembly communicating with said chamber, a plurality of passageways in said housing and communicating with said bore to deliver fluid thereto and therefrom, and a plunger in said bore, said plunger including a plurality of transverse grooves intermediate the top and bottom thereof, and a plurality of vertical grooves connecting some of said transverse grooves with the top of said plunger thereby placing said transverse grooves in communication with said chamber, said transverse grooves and said vertical grooves providing for the flow of fluid axially along said plunger to the top thereof and directly into and out of said chamber to bring about a precharging of said nozzle prior to a discharge of a relatively small quantity of fluid therefrom prior to a discharge of a main quantity of fluid therefrom.

3. In an injection pump assembly consisting primarily of a housing, a bore in said housing, means forming a part of said housing defining a fluid chamber in said housing and communicating with said bore, a valve controlled nozzle assembly communicating with said chamber, and a plunger movable in said bore having an end thereof movable into and out of said chamber, the provision of a plurality of passageways extending through said housing and into communication with said bore and said plunger, some of said passageways positioned at a point remote from said chamber, the other of said passageways positioned intermediate said remote passageways and said chamber, a first transverse groove on said plunger adapted to communicate with one of said remote passageways at a point along the path of movement of said plunger in said bore, a first axial groove in said plunger cooperating with said first transverse groove to provide a means for moving said fluid into and out of said chamber, a second transverse groove on said plunger adapted to communicate with said remote passageways at a point along the path of movement of said plunger in said bore, a second axial groove in said plunger cooperating with said second transverse groove to provide a means for moving fluid with relation to said chamber, and a third transverse groove on said plunger adapted to communicate with the other of said passageways at a point along the path of movement of said plunger in said bore to further provide an additional means for moving fluid with relation to said chamber.

4. A device suitable for use in an injection pump, said device including a barrel, a bore extending through said barrel, a plurality of fluid passageways extending through said barrel into communication with said bore, a plunger in said bore, a first transverse groove near one end of said plunger and adapted to be aligned with at least one of said passageways, a first axial groove extending along said plunger spaced inwardly from said one end thereof, a second transverse groove on said plunger spaced from said one end thereof and connected with said first transverse groove by said first axial groove, said second transverse groove adapted to be aligned with at least one of said passageways, said first axial groove extending between said first and second transverse grooves to allow communication therebetween, a third transverse groove on said plunger spaced from said one end thereof and adapted to become aligned with at least one of said passageways, and a second axial groove on said plunger extending from said third transverse groove to said one end of said plunger and out of communication with the other of said grooves.

5. A device suitable for use in an injection pump, said device including a barrel, a bore in said barrel, a plurality of fluid passageways extending through said barrel into communication with said bore, a plunger in said bore, a transverse rim on said plunger near one end thereof and extending inwardly of the end thereof, a first transverse groove on said plunger immediately inwardly of said rim, said first transverse groove adapted to communicate with at least one of said passageways, a second transverse groove spaced inwardly from said first transverse groove and adapted to communicate with at least one of said passageways, a first axial groove on said plunger intermediate said first transverse groove and said second transverse groove and adapted to provide communication between said first and second transverse grooves, said first axial groove provided with a curvilinear lateral expansion at its point of contact with said second transverse groove, a third transverse groove on said plunger spaced inwardly from said one end thereof and adapted to communicate with at least one of said passageways, and a second axial groove on said plunger extending from said third transverse groove to said one end of said plunger.

6. A device suitable for use in an injection pump, said device including a barrel, a bore in said barrel, a plurality of fluid passageways extending through said barrel into communication with said bore, a plunger in said bore, a first annular groove on said plunger spaced from one end thereof and adapted to communicate with at least one of said passageways, a first axial groove on said plunger extending from said first annular groove to said one end of said plunger, a second annular groove positioned inwardly from said first annular groove with respect to said one end of said plunger, said second annular groove adapted for communication with at least one of said passageways, a third annular groove on said plunger positioned inwardly from said second annular groove and adapted for communication with at least one of said passageways, a second axial groove on said plunger positioned intermediate said second and third annular grooves and in communication with said third annular groove, said second axial groove having one side thereof curvilinear with respect to the other side thereof, and an internal passageway in said plunger extending between and communicating with said third annular groove and said one end of said plunger.

7. An injection pump comprising a housing, a first bore in said housing, means forming a part of said housing defining a fluid chamber communicating with said first bore, an injection nozzle attached to said housing and communicating with said chamber through a second bore in said housing, a first pressure sensitive valve in said nozzle, a second pressure sensitive valve in said second bore intermediate said nozzle and said chamber, and a plunger in said first bore adapted to move toward and away from said chamber to control the delivery of fluid into and out of said chamber, said plunger including a first conduit means for directing a quantity of fluid into said chamber during the movement of said plunger from a first position to a second position toward said chamber, said plunger adapted to close said chamber during the movement of said plunger from said second position to a third position toward said chamber thereby to open said first and second pressure sensitive valves to discharge a relatively small quantity of fluid from said nozzle, a second conduit means forming a part of said plunger for directing a quantity of fluid out of said chamber during the movement of said plunger from said third position to a fourth position toward said chamber thereby reducing the fluid pressure in said chamber and closing said valves, said second conduit means further adapted to direct a quantity of fluid into said chamber during the movement of said plunger from said fourth position to a fifth position toward said chamber, said plunger adapted to close said chamber during the movement of said plunger from said fifth position to a sixth position toward said chamber thereby increasing the fluid pressure in said chamber to open said first and second pressure sensitive valves to discharge a relatively large quantity of fluid from said nozzle, and a third conduit means forming a part of said plunger for directing a quantity of fluid out of said chamber during the movement of said plunger from said sixth position to a seventh position toward said chamber and the return of said plunger from said seventh position to said sixth position during movement of said plunger away from said chamber, said plunger further adapted to being returned to approximately said fourth position and moved toward said chamber to said fifth position thereby refilling said chamber with fluid prior to its movement from said fifth position to an eighth position to recharge said nozzle and ultimately return to said first position.

8. A device suitable for use in an injection pump, said device including a barrel, a bore in said barrel, a plurality of fluid passageways extending through said barrel into communication with said bore, some of said passageways positioned at a point remote from the upper end of said barrel, the other of said passageways positioned intermediate said remote passageways and the upper end of said barrel, a plunger in said bore, a transverse rim on said plunger near one end thereof and extending inwardly of the end thereof, a first transverse groove on said plunger immediately inwardly of said rim, said first transverse groove adapted to communicate with at least one of said intermediate passageways, a second transverse groove on said plunger spaced inwardly from said first transverse groove and adapted to communicate with at least one of said intermediate passageways and at least one of said remote passageways, a first axial groove on said plunger intermediate said first transverse groove and said second transverse groove and interconnecting said first and second transverse grooves, said first axial groove provided with a curvilinear lateral expansion at its connection with said second transverse groove, a third transverse groove on said plunger spaced inwardly from the end thereof and substantially opposite said second transverse groove and adapted to communicate with at least one of said intermediate passageways and at least one of said remote passageways, and a second axial groove on said plunger extending from said third transverse groove to the end of said plunger and out of communication with said first and second transverse grooves and said first axial groove.

9. A device suitable for use in an injection pump, said device including a barrel, a bore in said barrel, a plurality of fluid passageways extending through said barrel into communication with said bore, some of said passageways remote from the end of said bore, the other of said passageways intermediate said remote passageways and the end of said bore, a plunger in said bore, a first annular groove on said plunger spaced from one end thereof and adapted to communicate with said remote passageways and said intermediate passageways independently during the movement of said plunger in said bore, a first axial groove on said plunger extending from said first annular groove to the end of said plunger, a second annular groove on said plunger positioned inwardly from said first annular groove with respect to said one end, said second annular groove adapted for communication with said intermediate passageways and said remote passageways independently during the movement of said plunger in said bore, a third annular groove on said plunger positioned inwardly from said second annular groove and adapted for communication with at least one of said remote passageways, a second axial groove on said plunger positioned intermediate of said second and third grooves and opening into said third groove, said second axial groove having one side and end thereof curvilinear with respect to the other side thereof, and an internal passageway in said plunger extending between and communicating with said third annular groove and the end of said plunger and out of communication with said first and second annular grooves and said first axial groove.

10. An injection pump comprising a housing, a bore in said housing, means forming a part of said housing defining a fluid chamber communicating with said bore, a valve controlled nozzle assembly communicating with said chamber, a plurality of passageways in said housing and communicating with said bore to deliver fluid thereto and therefrom, some of said passageways remote from said chamber, the other of said passageways intermediate said chamber and said remote passageways, and a plunger in said bore, said plunger being provided with a first transverse groove near one end thereof adapted to be aligned with at least one of said passageways, a first axial groove extending along said plunger spaced inwardly from the end thereof, a second transverse groove on said plunger spaced from the end thereof and connected with said first transverse groove by said first axial groove, said second transverse groove adapted to be aligned with at least one of said passageways, a third transverse groove on said plunger spaced from the end thereof and adapted to being aligned with at least one of said passageways, and a second axial groove on said plunger extending from said third transverse groove to the end of said plunger and out of communication with the other of said grooves.

11. An injection pump comprising a housing, a bore in said housing, means forming a part of said housing defining a fluid chamber communicating with said bore, a valve controlled nozzle assembly communicating with said chamber, a plurality of passageways in said housing and communicating with said bore to deliver fluid thereto and therefrom, some of said passageways positioned remote from said chamber, the other of said passageways positioned intermediate said chamber and said remote passageways, and a plunger in said bore, said plunger including a first annular groove spaced from one end thereof and adapted to communicate with at least one of said passageways, a first axial groove on said plunger extending from said first annular groove to the end of said plunger, a second annular groove positioned inwardly from said first annular groove with respect to the end of said plunger, said second annular groove adapted for communication with at least one of said passageways, a third annular groove on said plunger positioned inwardly from said second annular groove and adapted for communication with at least one of said passageways, a second axial groove on said plunger positioned intermediate of said second and third annular grooves and in communication with said third annular groove, said second axial groove having one side thereof curvilinear with respect to the other side thereof, and an internal passageway in said plunger extending between and communicating with said third annular groove in the end of said plunger.

12. An injection pump comprising a housing, a bore in said housing, means forming a part of said housing defining a fluid chamber communicating with said bore, a valve controlled nozzle assembly communicating with said chamber, a plurality of passageways in said housing and communicating with said bore to deliver fluid thereto and therefrom, a plunger in said bore, and means in said housing to move said plunger toward and away from said chamber, said plunger including a first series of annular and axial channels for alignment with at least one of said passageways to move fluid along said channels between said passageways and said chamber during the movement of said plunger within said bore, and a second series of annular and axial channels on said plunger for alignment with at least one of said passageways to move fluid along said last named channels between said passageways and said chamber during the movement of said plunger within said bore, said channels of each series communicating with one another to provide for the flow of fluid axially along said plunger to the end thereof adjacent said chamber and directly into and out of said chamber to bring about a precharging of said nozzle prior to a discharge of a relatively small quantity of fluid therefrom prior to a discharge of a main quantity of fluid therefrom.

13. An injection pump comprising a housing, a bore in said housing, means forming a part of said housing defining a fluid chamber communicating with said bore, a valve controlled nozzle assembly communicating with said chamber, a plurality of passageways in said housing and communicating with said bore to deliver fluid thereto and therefrom, a plunger in said bore, means operatively associated with said housing to move said plunger toward and away from said chamber, said plunger including a plurality of transverse slots intermediate the ends thereof, and a plurality of grooves on said plunger connecting some of said slots with the end of said plunger nearest said chamber, said slots in said grooves adapted to cooperate with said passageways to control the flow of fluid into and out of said chamber to bring about a precharging of said nozzle prior to a discharge of a relatively small quantity of fluid therefrom prior to a discharge of a main quantity of fluid therefrom, said means including a cam operatively engaged with the end of said plunger remote from said chamber, said cam adapted to move said plunger within said bore to control the alignment of said slots and said grooves with said passageways to bring about a predetermined cycle of the precharging and discharging of varying quantities of fluid from said nozzle.

14. In an injection pump having a housing in communication with a fluid supply source, a barrel communicating with a fluid chamber forming a part of said housing, a plunger in the barrel, plunger actuating means engaging said plunger to move it toward and away from the chamber to control the delivery of fluid into and out of the chamber, and a nozzle containing injection line in communication with the chamber; the provision of a pressure actuated valve in said nozzle, a delivery valve housing intermediate said chamber and said line, a delivery valve in the bore of said valve housing having a spring in engagement therewith to urge said delivery valve into closing relation with said bore, a delivery valve operated piston of substantial axial length and radial thickness in said bore near one end thereof, which piston is of sufficient axial length to require substantial movement to be displaced from said bore and which further is adapted to allow the flow of fluid through said bore into said line without requiring its total displacement from said bore, said piston still further being of sufficient mass to cause an instantaneous reduction in pressure in said line sufficient to close said pressure actuated valve in response to its movement away from said line, a series of passageways in said barrel to deliver fluid into and out of contact with said plunger, and means on said plunger to deliver fluid into and out of said chamber to bring about a discharge of a relatively small quantity of fluid from said nozzle prior to a discharge of a main quantity of fluid therefrom.

15. In an injection pump having a housing in communication with a fluid supply source, a barrel communicating with a fluid chamber forming a part of said housing, a plunger in the barrel, plunger actuating means engaging said plunger to move it toward and away from the chamber to control the delivery of fluid into and out of the chamber, and a nozzle containing injection line in communication with the chamber; the provision of a pressure actuated valve in said nozzle, a delivery valve housing intermediate said chamber and said line, a delivery valve in the bore of said valve housing having a spring in engagement therewith to urge said delivery valve into closing relation with said bore, a delivery valve operated piston of substantial axial length and radial thickness in said bore near one end thereof, which piston is of sufficient axial length to require substantial movement to be displaced from said bore and which further is adapted to allow the flow of fluid through said bore into said line without requiring its total displacement from said bore, said piston still further being of sufficient mass to cause an instantaneous reduction in pressure in said line sufficient to close said pressure actuated valve in response to its movement away from said line, a plurality of fluid passageways extending through said barrel into communication with said plunger, a transverse rim on said plunger near one end thereof and extending inwardly of the end thereof, a first transverse groove on said plunger immediately inwardly of said rim, said first transverse groove adapted to communicate with at least one of said passageways, a second transverse groove spaced inwardly from said first transverse groove and adapted to communicate with at least one of said passageways, a first axial groove on said plunger intermediate said first transverse groove and said second transverse groove and interconnecting said first and second transverse grooves, said first axial groove provided with a curvilinear lateral expansion at its connection with said second transverse groove, a third transverse groove on said plunger spaced inwardly from the end thereof and adapted to communicate with at least one of said passageways, and a second axial groove on said plunger extending from said third transverse groove to the end of said plunger, said passageways and said grooves cooperating with said delivery valve and said pressure actuated valve in said nozzle to bring about a discharge of a relatively small quantity of fluid from said nozzle prior to a discharge of a main quantity of fluid therefrom.

16. In an injection pump having a housing in communication with a fluid supply source, a barrel communicating with a fluid chamber forming a part of said housing, a plunger in the barrel, plunger actuating means engaging said plunger to move it toward and away from the chamber to control the delivery of fluid into and out of the chamber, and a nozzle containing injection line in communication with the chamber; the provision of a pressure actuated valve in said nozzle, a delivery valve housing intermediate said chamber and said line, a delivery valve in the bore of said valve housing having a spring in engagement therewith to urge said delivery valve into closing relation with said bore, a delivery valve operated piston of substantial axial length and radial thickness in said bore near one end thereof, which piston is of sufficient axial length to require substantial movement to be displaced from said bore and which further is adapted to allow the flow of fluid through said bore into said line without requiring its total displacement from said bore, said piston still further being of sufficient mass to cause an instantaneous reduction in pressure in said line sufficient to close said pressure actuated valve in response to its movement away from said line, a plurality of fluid passageways extending through said barrel into communication with said plunger, a first annular groove on said plunger spaced from one end thereof and adapted to communicate with at least one of said passageways, a first axial groove on said plunger extending from said first annular groove to the end of said plunger, a second annular groove positioned inwardly from said first annular groove with respect to the end of said plunger, said second annular groove adapted for communication with at least one of said passageways, a third annular groove on said plunger positioned inwardly from said second annular groove and adapted for communication with at least one of said passageways, a second axial groove on said plunger positioned intermediate said second and third annular grooves and opening into said third annular groove, said second axial groove having one side thereof curvilinear with respect to the other side thereof, and an internal passageway in said plunger extending between and communicating with said third annular groove at the end of said plunger, said passageways and said grooves cooperating with said delivery valve and said pressure actuated valve in said nozzle to bring about a discharge of a relatively small quantity of fluid from said nozzle prior to a discharge of a main quantity of fluid therefrom.

17. In a pump, a fuel injection line provided with a pressure actuated discharge nozzle, a pump chamber forming a part of said pump from which fuel is delivered under pressure to the line, a pressure actuated valve between the pump chamber and the line for retaining fuel under pressure in the line, a barrel having a bore which opens at one end into the pump chamber, a plunger which is reciprocable in the bore, a fuel supply chamber, passageway means in the barrel through which fuel is permitted to flow between the pump chamber and the bore in the barrel, conduit means in the plunger which communicate at different times in the movement of the plunger with the passageway means in the barrel and with the pump chamber to control the flow of fuel between the supply chamber and the pump chamber, and a cam in engagement with the plunger for reciprocating the plunger in the bore of the barrel, said cam being provided with a section which advances the plunger for but a portion of a full stroke, during which advance the conduit means in the plunger move momentarily out of register with the passageway means in the barrel and close off communication between the supply chamber and the pump chamber, causing the fuel trapped in the pump chamber to be delivered under pressure to the line to pre-charge the same, and said cam being provided with another section which fully advances the plunger, during which advance the conduit means in the plunger again close off communication between the supply chamber and the pump chamber, causing the fuel trapped in the pump chamber to first discharge from the nozzle the pre-charge in the line as a pilot injection and thereafter discharge from the nozzle a main injection.

18. In a pump, a fuel injection line provided with a pressure actuated discharge nozzle, a pump chamber forming a part of said pump from which fuel is delivered under pressure to the line, a pressure actuated valve between the pump chamber and the line for retaining fuel under pressure in the line, a barrel having a bore which opens at one end into the pump chamber, a plunger which is reciprocable in the bore, a fuel supply chamber, passageway means in the barrel through which fuel is permitted to flow between the pump chamber and the bore in the barrel, conduit means in the plunger which communicate at different times in the movement of the plunger with the passageway means in the barrel and with the pump chamber to control the flow of fuel between the supply chamber and the pump chamber, and a cam in engagement with the plunger for reciprocating the plunger in the bore of the barrel, said cam being provided with a section which advances the plunger for but a portion of a full stroke, during which advance the conduit means in the plunger move momentarily out of register with the passageway means in the barrel and close off communication between the supply chamber and the pump chamber, causing the fuel trapped in the pump chamber to be delivered under pressure to the line to pre-charge the same, and said cam being provided with another section which fully advances the plunger, during which advance the conduit means in the plunger again close off communication between the supply chamber and the pump chamber, causing the fuel trapped in the pump chamber to first discharge from the nozzle the pre-charge in the line as a pilot injection, then re-establishes such cam to abruptly end the pilot injection, and thereafter again close off such communication to discharge from the nozzle a main injection.

References Cited in the file of this patent

UNITED STATES PATENTS

| 1,993,759 | Stockmeyer | Mar. 12, 1935 |
| 2,090,688 | Lindberg | Aug. 24, 1937 |
| 2,420,164 | Bremser | May 6, 1947 |
| 2,430,801 | Bremser | Nov. 11, 1947 |